United States Patent
Mairet et al.

(10) Patent No.: US 11,047,111 B2
(45) Date of Patent: Jun. 29, 2021

(54) WORK VEHICLE WITH CONSTANT VELOCITY IMPLEMENT ACTUATION

(71) Applicant: DEERE & COMPANY, Moline, IL (US)

(72) Inventors: Sean A. Mairet, Dubuque, IA (US); Bryan Rausch, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 373 days.

(21) Appl. No.: 16/106,424

(22) Filed: Aug. 21, 2018

(65) Prior Publication Data

US 2020/0063398 A1    Feb. 27, 2020

(51) Int. Cl.
*A01B 3/10* (2006.01)
*E02F 9/20* (2006.01)
(Continued)

(52) U.S. Cl.
CPC .............. *E02F 9/2029* (2013.01); *E02F 3/43* (2013.01); *E02F 9/2203* (2013.01); *E02F 9/2271* (2013.01); *A01B 63/10* (2013.01)

(58) Field of Classification Search
CPC ................ B62D 35/001; B60G 17/019; B60G 2202/413; B60G 2600/182;
(Continued)

(56) References Cited

U.S. PATENT DOCUMENTS 3,587,630 A   6/1971 Dike
5,791,200 A   8/1998 Papasideris
(Continued)

FOREIGN PATENT DOCUMENTS

FR    1464933 A    1/1967

OTHER PUBLICATIONS

Vihonen et al., Joint-Space Kinematic Model for Gravity-Referenced Joint Angle Estimation of Heavy-Duty Manipulators, 2017, IEEE, (Year: 2017).*
(Continued)

*Primary Examiner* — McDieunel Marc
(74) *Attorney, Agent, or Firm* — Klintworth & Rozenblat IP LLP (57) ABSTRACT

A work vehicle includes a frame; an implement; a linkage assembly mounting the implement to the frame; a linkage actuator coupled to the linkage assembly and the frame and configured to reposition the linkage assembly relative to the frame; a sensor configured to generate sensor position data associated with at least one of the linkage assembly and the linkage actuator representing a linkage position; an operator interface configured to receive operator input from an operator associated with the linkage actuator representing a velocity request; and an electronic control system having processing and memory architecture operatively coupled to the sensor, operator interface, and linkage actuator. The electronic control system is configured to generate an actuator command for the linkage actuator based on the velocity request and the linkage position that, upon execution, results in a constant velocity of the implement for the operator input regardless of the linkage position.

20 Claims, 4 Drawing Sheets

(51) Int. Cl.
*E02F 9/22* (2006.01)
*E02F 3/43* (2006.01)
*A01B 63/10* (2006.01)

(58) Field of Classification Search
CPC .......... G01N 2291/2636; G01S 13/931; G01S 17/931; B60N 2/0248; E02F 3/3414; E02F 3/43; E02F 3/439; E02F 9/264; E02F 3/434; E02F 3/432; E02F 3/433; E02F 3/437; E02F 9/2041; E02F 9/2221; E02F 9/2029; E02F 9/2203; E02F 9/2271; A01B 63/10
See application file for complete search history.

(56) References Cited

U.S. PATENT DOCUMENTS

| | | | | |
|---|---|---|---|---|
| 6,115,660 | A * | 9/2000 | Berger | E02F 3/432 701/50 |
| 6,233,511 | B1 * | 5/2001 | Berger | E02F 3/432 414/699 |
| 6,584,710 | B1 * | 7/2003 | Lin | B60G 3/145 172/2 |
| 8,095,281 | B2 | 1/2012 | Peterson et al. | |
| 8,577,564 | B2 * | 11/2013 | Stanek | E02F 9/2037 701/50 |
| 2003/0116936 | A1 * | 6/2003 | Felsing | B60G 11/183 280/124.166 |
| 2008/0263908 | A1 * | 10/2008 | Schoenmaker | E02F 9/2041 37/348 |
| 2008/0263911 | A1 * | 10/2008 | Shoenmaker | E02F 3/439 37/348 |
| 2010/0287921 | A1 | 11/2010 | Trifunovic | |
| 2014/0167971 | A1 * | 6/2014 | Stanley | G01G 19/083 340/666 |
| 2014/0290102 | A1 * | 10/2014 | O'Donnell | E02F 9/2012 37/403 |
| 2016/0108602 | A1 | 4/2016 | Singh et al. | |
| 2016/0295814 | A1 | 10/2016 | Raszga et al. | |
| 2017/0079220 | A1 * | 3/2017 | Hunt | A01G 23/091 |
| 2017/0254049 | A1 * | 9/2017 | Kean | E02F 3/3604 |
| 2017/0275848 | A1 * | 9/2017 | Marquette | E02F 3/434 |
| 2017/0328031 | A1 * | 11/2017 | Jang | E02F 9/2029 |
| 2018/0171590 | A1 * | 6/2018 | Kean | E02F 9/205 |
| 2018/0245306 | A1 * | 8/2018 | Lewis | E02F 3/3414 |
| 2019/0010966 | A1 * | 1/2019 | Bellows | F15B 11/20 |
| 2019/0338809 | A1 * | 11/2019 | Clark | A01B 69/001 |
| 2020/0063398 | A1 * | 2/2020 | Mairet | E02F 3/43 |

OTHER PUBLICATIONS

Sepehri et al., Model-based Sensor-based Velocity Control of Teleoperated Heavy-duty Hydraulic Machines, 2002, IEEE, pg. (Year: 2002).*

German Search Report issued in counterpart application No. 102019210805.9 dated May 7, 2020 (10 pages).

* cited by examiner

WORK VEHICLE WITH CONSTANT VELOCITY IMPLEMENT ACTUATION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and improving operation of work vehicles, particularly with respect to the consistency of implement actuation.

BACKGROUND OF THE DISCLOSURE

Work vehicles, such as those in the agricultural, construction and forestry industries, perform a variety of operations. In some instances, the vehicles are provided with a work implement or tool to perform a desired function. In one example, a construction vehicle, such as a skid steer and compact loader, includes a linkage assembly coupled to a frame for lifting a work implement, such as a bucket, forklift, or grapple. The linkage assembly is operably controlled by a vehicle operator using controls disposed in a cab of the vehicle. Despite the numerous capabilities of current vehicles, designers continue to seek improvements in operation, particularly with respect to actuation of the implement.

SUMMARY OF THE DISCLOSURE

The disclosure provides a work vehicle with a constant velocity implement controller.

In another aspect, the disclosure provides a work vehicle that includes a frame; an implement; a linkage assembly mounting the implement to the frame; a linkage actuator coupled to the linkage assembly and the frame and configured to reposition the linkage assembly relative to the frame; a sensor configured to generate sensor position data associated with at least one of the linkage assembly and the linkage actuator representing a linkage position; an operator interface configured to receive operator input from an operator associated with the linkage actuator representing a velocity request; and an electronic control system having processing and memory architecture operatively coupled to the sensor, the operator interface, and the linkage actuator. The electronic control system is configured to generate an actuator command for the linkage actuator based on the velocity request and the linkage position that, upon execution, results in a constant velocity of the implement for the operator input regardless of the linkage position.

In a further aspect, the disclosure provides a method for controlling a linkage actuator on a work vehicle for manipulating an implement coupled to a frame of the work vehicle with a linkage assembly. The method includes receiving operator input at an operator interface as operator input data; determining a velocity request based on the operator input data; collecting sensor position data with a sensor associated with at least one of the linkage assembly and the linkage actuator; determining a linkage position of the at least one of the linkage assembly and the linkage actuator based on the sensor position data; generating an actuator command for the linkage actuator based on the velocity request and the linkage position that, upon execution, results in a constant velocity of the implement for the operator input regardless of the linkage position; and executing the actuator command at the linkage actuator to reposition the implement.

In another aspect, the disclosure provides a control system in a work vehicle for controlling a linkage actuator for manipulating an implement coupled to a frame of the work vehicle with a linkage assembly. The control system includes one or more electronic controllers having processing and memory architecture including an operator input module, a position module, and a constant velocity module. The operator input module configured to receive operator input data associated with operator input at a vehicle operator interface and to determine a velocity request based on the operator input data. The position module is configured to receive sensor position data associated with at least one of the linkage assembly and the linkage actuator and to determine a linkage position of the at least one of the linkage assembly and the linkage actuator based on the sensor position data. The constant velocity module is coupled to receive the velocity request from the operator input module and the linkage position from the position module and configured to generate an actuator command for the linkage actuator that, upon execution, results in a constant velocity of the implement for the operator input regardless of the linkage position.

The details of one or more embodiments are set forth in the accompanying drawings and the description below. Other features and advantages will become apparent from the description, the drawings, and the claims.

DETAILED DESCRIPTION

The following describes one or more example implementations of the disclosed system and method for improving work vehicle operation as shown in the accompanying figures of the drawings described briefly above. Various examples herein refer to the context of a skid steer or skid steer loader. It will be understood, however, that the disclosed systems and methods may be utilized in a variety of work machine or work vehicle settings, as described below. Various modifications to the example embodiments may be contemplated by one of skill in the art.

Generally, the disclosed systems and methods (and work vehicles in which they are implemented) provide for constant velocity implement control to perform various tasks, thereby enabling more consistent and reliable implement manipulation. As will be described, an implement controller of the work vehicle operates to control linkage actuators such that a relatively constant implement velocity for a particular operator input is achieved, regardless of the linkage position in an actuation cycle. Unless otherwise addressed, the velocity of the implement for a particular actuator command may be impacted by a mechanical advantage of the linkage assembly at a respective linkage position within the actuation cycle. As described below, the implement controller may accommodate the variation in the mechanical advantage of the linkage assembly throughout the actuation cycle. This operation improves efficiency, safety, and consumer satisfaction.

Figure 1:
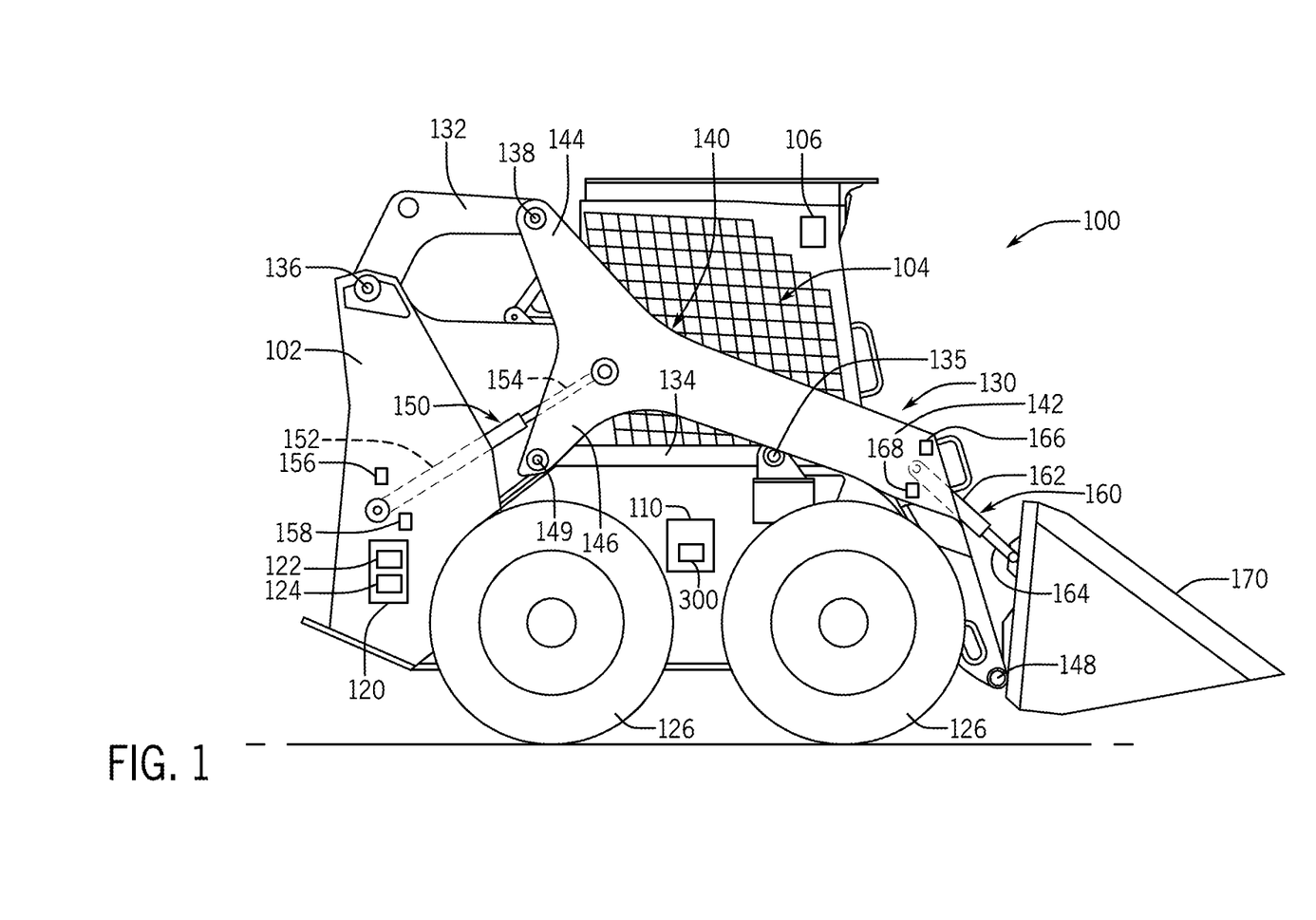
FIG. 1 is a side view of an example work vehicle in the form of a skid steer in which the disclosed implement controller may be used.

FIG. 1 is a side view of a work vehicle (or work machine) 100. The work vehicle 100 is illustrated as a skid steer (or skid steer loader). However, this disclosure is not intended to be limited to a skid steer, but rather may include any type of agricultural, construction, or forestry machinery. Additionally, although a work vehicle is discussed below, embodiments are also applicable to any type of work machine with an implement, including those that are stationary. It will be understood that the configuration of the work vehicle 100 is presented as an example only.

In the depicted embodiment, the work vehicle 100 includes a linkage (or boom) assembly 130 mounted on a frame or chassis 102 that enables manipulation of an implement 170 to perform various functions or tasks. The work vehicle 100 further includes a machine control system 110 to facilitate operation of the vehicle 100, including overall movement with propulsion system 120 and/or manipulation of the implement 170. As described in greater detail below after an introduction of the vehicle components, embodiments discussed herein provide an implement controller 300 that may be at least partially incorporated into the machine control system 110 and that enables a more consistent and smoother actuation of the linkage assembly 130 and/or implement 170 across a range of actuation positions.

In this example, the work vehicle 100 includes a cab 104 formed on the frame 102 to house a machine operator. One or more operator (or human-machine) interfaces 106 may be provided within the cab 104 to enable operator interaction with the vehicle 100, particularly the control system 110. The operator interface 106 may be configured in a variety of ways. In some embodiments, the operator interface 106 may include one or more joysticks, various switches or levers, one or more buttons, control panel, a touchscreen interface or cursor control device that operates with a display, a keyboard, an audible device, a microphone associated with a speech recognition system, or various other human-machine interface devices that support operator input and/or output of information to and from the control system 110, particularly the implement controller 300.

During operation, the operator interface 106 may receive an input in the form of an actuation request from the operator to reposition the implement 170. Examples of the operator interface 106 suitable for operating the implement 170 may include one or more joysticks, levers, switches, or dials. In addition to changing the position of the implement 170, the operator interface 106 may be configured such that the actuation request includes a selection or indication of a desired implement velocity as a velocity request. In particular, the relative magnitude of the displacement of the operator interface 106 may provide a representation of the desired magnitude of the implement velocity.

For example, if the operator interface 106 for the implement 170 is a joystick, movement of the joystick slightly away from a neutral position (or origin) may indicate that the operator desires to reposition the implement 170 with a relatively low velocity; and movement of the joystick to the outer limit of the joystick range may indicate that the operator desires to reposition the implement 170 with a relatively high velocity. In other words, the relative position or movement of the operator interface 106 relative to a neutral position may represent the desired relative velocity of the resulting implement motion. However, any mechanisms for representing desired velocity may be provided.

In further examples, the operator interface 106 may be in the form of switches (or the like) that, upon selection, generate a command to reposition the implement 170 into a predetermined or set position at a predetermined velocity. Examples of predetermined positions may include a return-to-maximum height position or a return-to-minimum height position. Additional details regarding the operator interface input and the implement velocity are provided below.

In some examples, the operator interface 106 may be off-machine. For example, the operator interface 106 may be implemented in a command center or on a mobile device that accepts input from an operator and transmits the input to the vehicle 100. In such an example, the vehicle 100 may include a suitable communication component (not shown), such as a Bluetooth® transceiver, a radio transceiver, a cellular transceiver, an LTE transceiver, and/or a Wi-Fi transceiver.

The work vehicle 100 may further include a propulsion system 120 (schematically shown), such as an engine 122 that supplies power to drive one or more wheels 126 via a transmission 124 based on signals from the control system 110. In one example, the engine 122 is an internal combustion engine, such as a diesel engine. It should be noted that the use of an internal combustion engine is merely an example, and the propulsion device may be a fuel cell, an electric motor, a hybrid-gas electric motor, etc. The transmission 124 transfers the power from the engine 122 to a suitable driveline coupled to the wheels 126, thereby enabling movement. In this example, a wheel 126 is positioned at each corner of the frame 102; however, in further arrangements, other ground-engaging mechanisms may be implemented. For example, such as in a compact track loader, the ground-engaging mechanism may be a drive track disposed on each side of the machine.

In addition to those aspects depicted in FIG. 1, the work vehicle 100 may include various other components or systems that are typical on work vehicles. Examples include lubrication and cooling systems; battery systems; exhaust treatment systems; power steering systems; braking systems; and the like.

As introduced above, the implement 170 is mounted to the vehicle 100 with the linkage assembly 130. In this example, the linkage assembly 130 functions to lift, lower, and pivot the implement 170 according to signals provided by the control system 110, particularly the implement controller 300, based in part on operator input at the operator interface 106.

As shown, the linkage assembly 130 includes an upper link 132, a lower link 134, and a boom 140 that are configured to be cooperatively manipulated relative to the frame 102 with a lift actuator 150. The implement 170 is pivotally mounted to the end of the linkage assembly 130 for actuation by a tilt actuator 160. In FIG. 1, only one side of the linkage assembly 130 is depicted. Typically, links, boom, and actuators corresponding to the links 132, 134, boom 140, and actuators 150, 160 are provided on the opposite side of the vehicle 100 as well. The linkage assembly 130 of FIG. 1 is only one type of linkage assembly, and other arrangements, configurations, and/or components may be provided.

In this example, a rearward portion of the upper link 132 pivotally connects to the frame 102 near an upper and rearward portion at a first pivot point (or pin) 136. A forward portion of the upper link 132 pivotally connects to the boom 140 at a second pivot point 138.

In this example, the boom 140 forms a forked shape, with a front arm 142 forming a forward portion and splitting into an upper arm 144 and a lower arm 146 for a rearward portion. The front arm 142 of the boom 140 pivotally connects to the implement 170 substantially about the third pivot point 148. The upper arm 144 of the boom 140 pivotally connects to the upper link 132 substantially about the second pivot point 138. The lower arm 146 pivotally connects to the lower link 134 substantially about a fourth pivot point 149. The lower link 134 is a straight bar with a rearward portion pivotally connected to the boom 140, substantially about the fourth pivot point 149, and a forward portion pivotally connected to the frame 102, substantially about a fifth pivot point 135.

The configuration of the linkage assembly 130 in FIG. 1 may be considered a modified radial lift linkage, or a vertical lift linkage, due to its performance characteristics while being raised and lowered. Other arrangements may be implemented. For example, certain skid steers may utilize a single rigid member as a linkage assembly, with a first end of the member pivotally connected near the rear of the frame and the second end pivotally connected to the implement.

Figure 2:
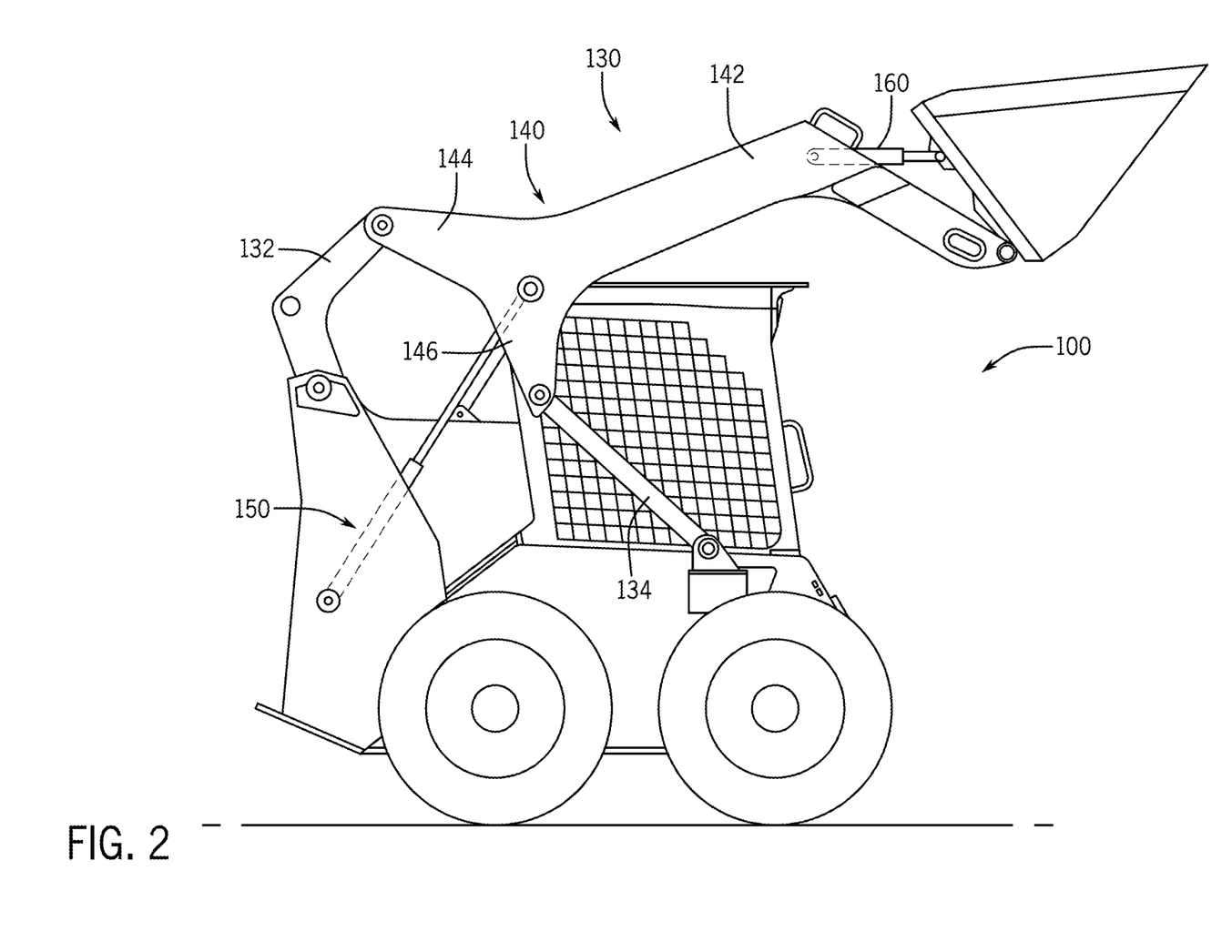
FIG. 2 is a further side view of the work vehicle of FIG. 1 upon actuation of the implement.

Generally, the lift actuator 150 extends between frame 102 and boom 140 and operates to lift and lower the linkage assembly 130 between a first (or minimum height) position, as shown in FIG. 1; a second (or maximum height) position; and the intermediate positions in between. Reference is additionally made to FIG. 2, in which the boom 140 has been repositioned from the first position into the second position by the lift actuator 150. The respective position enabled by the linkage assembly 130 and lift actuator 150 may be considered a linkage position, and the range of linkage positions from the first position to the second position (including the intermediate positions) may be referred to as an "actuation cycle" (or "lift path"), which is described in greater detail below.

In this example, each lift actuator 150 is a hydraulic cylinder actuator with a cylinder 152, a rod (or piston) 154, a control interface 156 (schematically shown), and at least one position sensor 158 (schematically shown). The cylinder 152 has one end mounted to the frame 102 and partially houses one end of the rod 154, while the other end (or distal end) of the rod 154 is mounted to the boom 140. The rod 154 is repositioned within the cylinder 152 by modifying the fluid pressure on one or both sides of the end of the rod 154 within the cylinder 152. In particular, the control interface 156 controls the amount of hydraulic fluid into and out of the cylinder 152 to extend and retract the rod 154 out and into of the cylinder 152. As the rod 154 is extended and retracted, force is applied to the boom 140 to lift and lower the linkage assembly 130, and thus, the implement 170. The control interface 156 may include any suitable type of control mechanism, such as an electromechanical valve, an actuator, a servo-motor, a solenoid, or another electrically controlled device for controlling or regulating hydraulic fluid associated with the cylinder 152. As described in greater detail below, the control interface 156 controls operation of the lift actuator 150 based on actuation commands from the control system 110, particularly the implement controller 300.

The position sensor 158 is generally arranged to collect position data that facilitates a determination of the linkage position of the lift actuator 150 and/or linkage assembly 130 within the actuation cycle. In this example, since the actuator 150, linkage assembly 130, and implement 170 have fixed relative relationships, the position data of the actuator 150 provides an indication of the position of the linkage assembly 130 and/or implement 170. In further examples, the position sensor 158 may measure the position of the linkage assembly 130. The position sensor 158 provides the position data to the implement controller 300 such that the linkage position of the linkage assembly 130 and/or the implement 170 may be determined.

The position sensor 158 may take any suitable form to determine the position of the actuator 150 and/or linkage assembly 130 within the actuation cycle. For example, the sensor 158 may be a linear sensor to detect the linear position of the rod 154 relative to the cylinder 152, e.g., by determining a rod length within the cylinder 152 or outside the cylinder 152. In another example, the sensor 158 and/or linkage assembly 130 may be an angular sensor that measures the angular position of the boom 140. As examples, sensor 158 may incorporate one or more of the following: linear potentiometers; rotary potentiometers; magnetic sensors; ultrasonic position detectors; magnetic position detectors; image or optical position detectors; and/or radar, lidar, and/or similar sensors. The sensor 158 may be arranged on or within the actuator 150, on or near the boom 140, or any suitable position.

The tilt actuator 160 (one of which is shown) operates in a similar manner to the lift actuator 150 to manipulate the implement 170. While the lift actuator 150 functions to lift and lower the implement 170 via the linkage assembly 130, the tilt actuator 160 operates to tilt the implement 170 forward and back relative to the end of the linkage assembly 130, e.g., to secure or dump a load. In some embodiments, the tilting of the implement 170 by the tilt actuator 160 may be considered a tilt portion of the actuation cycle.

As above, the tilt actuator 160 may include a cylinder 162, a rod (or piston) 164, a control interface 166 (schematically shown), and at least one position sensor 168 (schematically shown). The cylinder 162 has one end mounted to the end of the boom 140 and partially houses one end of the rod 164, while the other end (or distal end) of the rod 164 is mounted to the implement 170. The control interface 166 controls the amount of hydraulic fluid into and out of the cylinder 162, thereby extending and retracting the rod 164 and tilting the implement 170. The control interface 166 may include any suitable type of control mechanism, such as those described above, and operates based on signals from the control system 110, particularly the implement controller 300.

The position sensor 168 is generally arranged to collect position data that facilitates a determination of the position of the tilt actuator 160 by the implement controller 300. The position sensor 168 may take any suitable form to determine the position of the actuator 160 and/or implement 170, including those discussed above.

Accordingly, the actuators 150, 160 are appropriately mounted to the frame 102, the linkage assembly 130, and/or the implement 170 to be driven in order to manipulate the implement 170. Although the vehicle 100 in FIGS. 1 and 2 is depicted with two actuators 150, 160, and two more are provided on the other side, additional or fewer actuators may be provided in other configurations.

In addition to the components represented in FIG. 1 associated with the actuators 150, 160, the vehicle 100 may include one or more pumps, control valves, and conduits (not shown) to provide fluid to the actuators 150, 160 according to commands from the control system 110 and/or implement controller 300 to facilitate the operation described herein. Additionally, although the actuators 150, 160 in this example are hydraulic actuators, operation of the implement controller 300 discussed herein may be implemented with respect to any type of actuator capable of producing relative movement.

Generally, as noted above, the control system 110 functions to control various aspects of the work vehicle 100. The control system 110 may be configured as a computing device with associated processor devices and memory architectures, as a hard-wired computing circuit (or circuits), as a programmable circuit, as a hydraulic, electrical or electro-hydraulic controller, or otherwise. As such, the control system 110 may be configured to execute various computational and control functionality with respect to the work vehicle 100 (or other machinery). In some embodiments, the control system 110 may be configured to receive input data as signals in various formats (e.g., as hydraulic signals, voltage signals, current signals, and so on), and to output commands as signals in various formats (e.g., as hydraulic signals, voltage signals, current signals, mechanical movements, and so on). An example location for the control system 110 is depicted in FIG. 1. It will be understood, however, that other locations are possible including other locations on the work vehicle 100, or various remote locations.

In addition to the sensors 158, 168 discussed above, various sensors may also be provided to observe conditions associated with the work vehicle 100, and thus, may be considered part of, or otherwise in communication with, control system 110. In some embodiments, various sensors (e.g., pressure, flow or other sensors) may be disposed near pumps and control valves, or elsewhere on the work vehicle 100, to observe a pressure within the hydraulic circuits. Further examples include sensors to measure various parameters, such as implement speed, vehicle speed, lubricant or fluid temperature, engine temperature, and the like.

During operation, the control system 110 outputs one or more control signals or control commands to various components of the work vehicle 100 to perform functions. As described in greater detail below, the implement controller 300 receives one or more types of input data and provides appropriate commands to the actuators 150, 160 to manipulate the implement 170. For example, the implement controller 300 may generate suitable commands for the operator interfaces 156, 166 and associated components for repositioning the linkage assembly 130 and the implement 170 based on sensor data received from the sensors 158, 168 and input data received from the operator interface 106, as well as other considerations.

As will now be described, the implement controller 300 operates to control the actuators 150, 160 such that a relatively constant velocity is achieved, regardless of the linkage position in the actuation cycle. Unless otherwise addressed, the velocity of the implement for a particular actuator command may be impacted by a mechanical advantage of the linkage assembly at a respective linkage position within the actuation cycle. As described below, the implement controller 300 accommodates the variation in the mechanical advantage of the linkage assembly 130 throughout the actuation cycle. Generally, mechanical advantage is considered the force amplification achieved by using a mechanical system. In the context of linkage assembly 130, the variation in mechanical advantage during the actuation cycle may be a result of the varying distance between the center of mass of the implement 170 and the hypothetical system fulcrum location (e.g., the combination of pivot points) relative to the lift actuator 150. In effect, the mechanical advantage in this context may be considered to represent the magnitude of the ratio of the cylinder velocity to implement velocity. As described below, the implement controller 300 may provide actuator commands to achieve a cylinder velocity that maintains a constant implement velocity based on the mechanical advantage for a particular linkage position in the actuation cycle.

Generally, the implement controller 300 and operation of the implement 170 with a constant velocity are discussed below with reference to lift actuator 150, although similar commands may be generated for actuator 160, as well as any other actuator associated with the linkage assembly 130. In some examples, control operation may be considered with respect to actuator 150 in cooperation with actuator 160, e.g., in order to implement a compound movement of implement 170 by multiple actuators 150, 160. Additionally, although discussed below with respect to a single actuator 150, corresponding commands are provided to the lift actuator on the other side such that the lift actuators may cooperate to reposition the implement 170.

Figure 3:
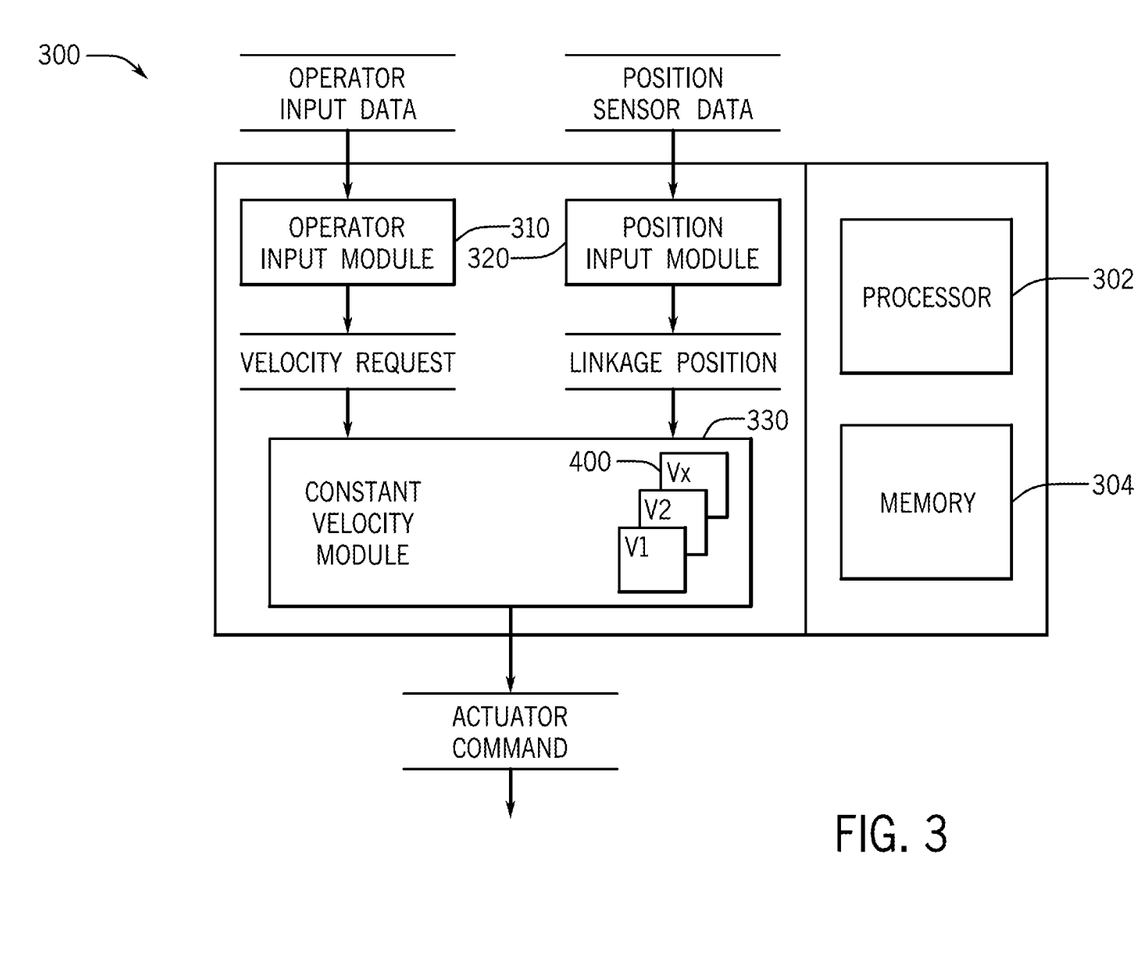
FIG. 3 is a functional block diagram with dataflows illustrating an example implement controller of the work vehicle of FIG. 1 in accordance with an example embodiment.

Reference is additionally made to FIG. 3, which is a functional block diagram with dataflows illustrating an embodiment of the implement controller 300 for the work vehicle 100. The implement controller 300 may be organized as one or more functional units or modules 310, 320, and 330 (e.g., software, hardware, or combinations thereof). As an example, each of the modules 310, 320, 330 may be implemented with processing architecture such as a processor 302 and memory 304. For example, the controller 300 may implement the modules 310, 320, 330 with the processor 302 based on programs or instructions stored in memory 304. As can be appreciated, the modules 310, 320, 330 shown in FIG. 3 may have a different organization and may be combined and/or further partitioned to similarly control the various components of the work vehicle 100 discussed above.

In one embodiment, the implement controller 300 includes an operator input module 310, a position input module 320, and a constant velocity module 330. As described below, the modules 310, 320, 330 function to generate control signals representing actuator commands for operating the lift actuator 150 based on one or more of operator input data, sensor position data, and any other relevant data.

The operator input module 310 receives operator input data from the operator interface 106 associated with a desired or requested implement actuation. As one example, the operator input data may be in the form of a joystick or lever position that provides an indication of the desired implement velocity. As such, the operator input module 310 may receive the operator input data and determine a desired implement velocity as a velocity request. This determination may be implemented with a look-up table or map that associates the input at the operator interface 106 with a velocity request. As introduced above, the desired or expected velocity in the velocity request may be relative or qualitative in operator expectation and based on a number of factors, including manufacturer testing, safety issues, consumer preferences, control sensitivity, machine limitations, etc. The resulting velocity request from the operator input module 310 is provided to the constant velocity module 330.

The position input module 320 receives sensor position data associated with the lift actuator 150 and/or linkage assembly 130, e.g., from position sensor 158. The position input module 320 receives the sensor position data and determines the linkage position within the actuation cycle. For example, the linkage position may be the minimum-height position, the maximum-height position, or one of the numerous positions in between. As one example, this determination may be implemented with a look-up table or map that associates the position of the actuator 150 with the linkage position and may be based on the particular relationship between the sensor 158, actuator 150, and/or the configuration of the linkage assembly 130. The resulting linkage position from the position input module 320 is provided to the constant velocity module 330.

The constant velocity module 330 receives the velocity request and the linkage position, and in response, generates an actuator command that provides a generally constant implement velocity regardless of the respective linkage position within the actuation cycle by considering the mechanical advantage of the linkage position. As discussed above, the mechanical advantage of the linkage assembly 130 may vary based on the linkage position, thereby impacting the force and velocity relationships between the actuator 150 and the implement 170. Specifically, the force required by the actuator 150 to move the implement at a particular speed may be different for one linkage position than another linkage position based on the different mechanical advantages. As such, the constant velocity module 330 generates an actuator command based on the linkage position that results in a constant velocity. Over time, as the linkage position changes, the implement controller 300 (particularly, the constant velocity module 330) generates new actuator commands to maintain the velocity as the linkage position changes during the actuation cycle.

In one embodiment, the actuator commands may be in the form of a commanded valve position (e.g. a signal that results in a particular valve position) for the actuator control interface 156 such that the actuator 150 generates the appropriate force to reposition the linkage assembly 130 with the requested velocity. Other command formats and/or commands may be generated for cooperating and associated components (e.g., pumps, other valves, etc.).

The constant velocity module 330 may generate the actuator commands in any suitable manner. In one example, the constant velocity module 330 includes one or more maps (or look-up tables) 400 that define a relationship between velocity requests, lift positions, and actuator commands based on mechanical advantage and other considerations.

Figure 4:
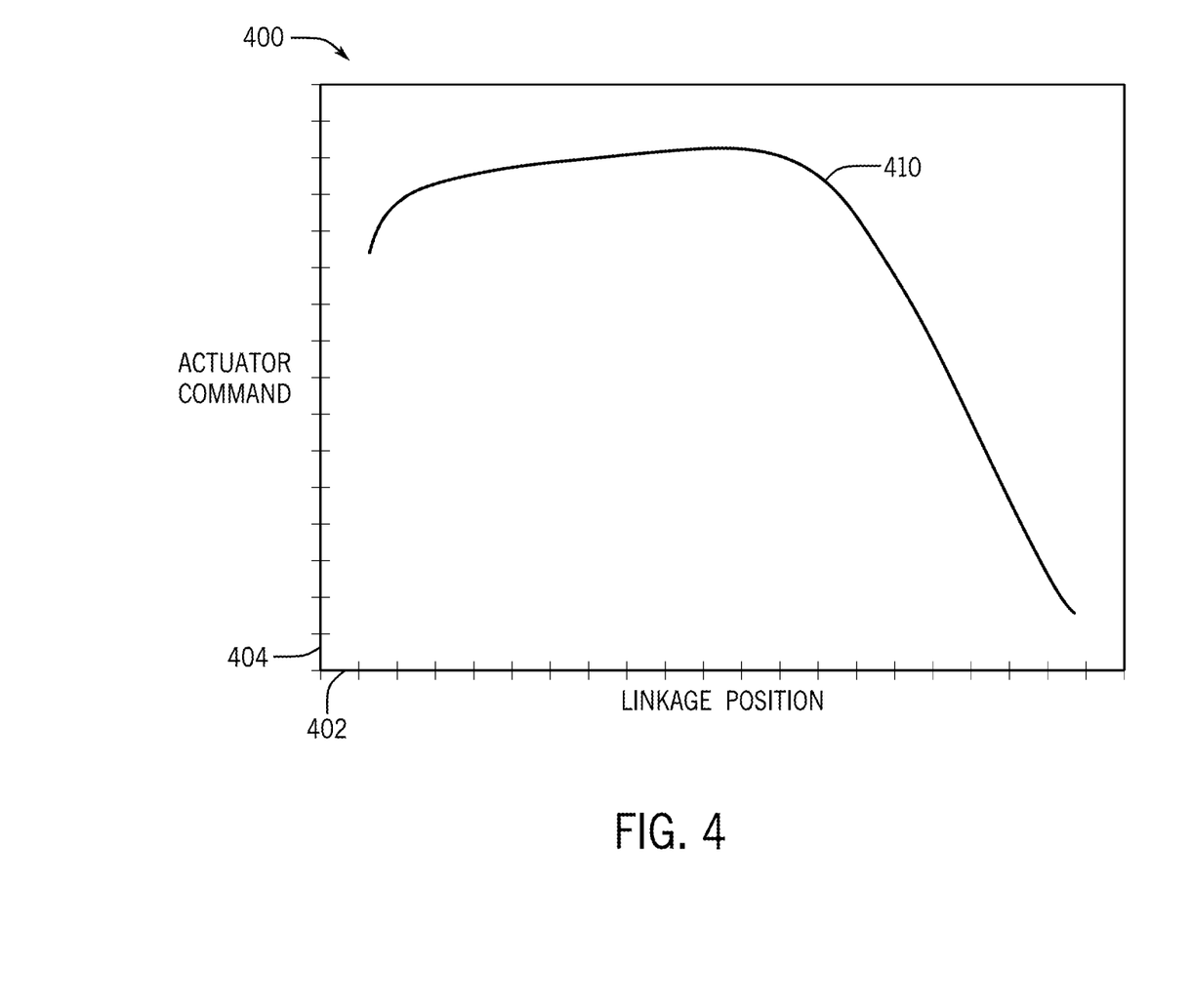
FIG. 4 is an example position-command map for a requested velocity that may be used by the implement controller of FIG. 3; and Like reference symbols in the various drawings indicate like elements.

Reference is briefly made to FIG. 4, which is an example map 400 that may be used by the constant velocity module 330. As shown, the map 400 depicts an actuator command curve 410 for a particular requested velocity that, upon implementation, results in a constant velocity at the implement 170. Other requested velocities may have corresponding curves and/or maps. In this example, the map 400 is a position-command map in which the actuator command curve 410 represents the relationship between linkage position on the horizontal axis 402 and the resulting actuator command signal on the vertical axis 404. The specific units of the linkage position and the resulting command signal may vary. In this example, a minimum-height position of the linkage assembly 130 is represented on the left-side end of the horizontal axis 402 and a maximum-height position is represented on the right-side end of the horizontal axis 402. Further in this example, the relative magnitude of values of the actuator command curve 410 on the vertical axis 404 represent the relative magnitude of the actuator command, e.g., a valve position or the magnitude of the current or voltage signal required to move the valve into a designated position.

As noted above, the actuator command curve 410 indicates the changes in mechanical advantage that are considered and accommodated in the resulting actuator commands to maintain a constant velocity. In the depicted example of FIG. 4, the actuator command curve 410 represents that, from a relatively low linkage position, the valve position represented by the actuator command signal increases (e.g., moves to a particular side) as the linkage position increases, and then levels off (e.g., maintains a position) around the middle linkage positions, prior to decreasing (e.g., moves back to the other side) as the linkage position continues to increase. As noted above, the actuator command curve 410 is provided for a requested velocity derived from operator input at the operator interface 106. If the operator input is modified, the constant velocity module 330 may select another map corresponding to the modified requested velocity.

The actuator command curve 410 and associated curves for the various requested velocities may be generated in any suitable manner. In one example, the actuation command curves are generated based on a mechanical analysis of the linkage assembly, typically during the design or assembly of the work machine. In other examples, the actuation command curves may be based on empirical or testing data. In some examples, the actuator command curve 410 may be omitted, and the actuator command may be generated based on a data file, a look-up table, or an equation (e.g., a line equation, a quadratic equation, or a curve equation).

In some instances, different types of actuators and linkage arrangements may be used to manipulate an implement. In such cases, the constant velocity module 330 may utilize compound or multidimensional maps or look-up tables in which combinations of linkage positions result in a combination of actuator commands that provide constant implement velocity.

Returning to FIG. 3, in some embodiments, the implement controller 300 may receive other types of relevant information associated with the work vehicle 100 from the various sensors, other control modules, and/or other systems. Examples include engine speed, fluid temperatures, and the like. The implement controller 300 may consider this information when generating the actuator command, e.g., as a modifier or another variable in the maps 400.

Accordingly, the constant velocity module 330 generates an actuator command for a particular linkage position and velocity request. The implement controller 300 sends the actuator command to the lift actuator 150 for implementation.

Typically, the implement controller 300 operates in an iterative or continuous manner. Upon generating an actuator command, the implement controller 300 again receives and considers operator input data and position data and generates new actuator commands. In effect, the implement controller 300 utilizes open loop control logic rather than closed loop. Specifically, although the implement controller 300 may modify actuator commands in response to new inputs, the implement controller 300 typically does not use velocity or position feedback in order to iteratively achieve a target velocity. Instead, the implement controller 300 generates actuator commands that result in a constant implement velocity corresponding to the requested velocity, regardless of variations of mechanical advantage during the actuation cycle.

Embodiments discussed herein may also be implemented as a method for controlling the linkage actuator on the work vehicle discussed above. For example, the method may include receiving operator input at an operator interface as operator input data; determining a velocity request based on the operator input data; collecting sensor position data associated with at least one of the linkage assembly or the linkage actuator; determining a linkage position of the at least one of the linkage assembly or the linkage actuator based on the sensor position data; generating an actuator command for the linkage actuator based on the velocity request and the linkage position that, upon execution, results in a constant velocity of the implement for the operator input regardless of the linkage position; and executing the actuator command at the linkage actuator to reposition the implement.

Although the embodiments above are discussed with respect to a skid steer, other types of vehicles and machines may use similar control systems and implement controllers in which a constant implement velocity is desired. Example vehicles include, articulated dump trucks, backhoe loaders, haulers, graders, tractors, combines, harvesters, yarders, skylines, feller bunchers, and so on.

Accordingly, embodiments provide constant velocity implement control for an operator input, regardless of linkage position. This results in a more consistent operation and improved customer satisfaction.

Also, the following examples are provided, which are numbered for easier reference.

1. A work vehicle includes a frame; an implement; a linkage assembly mounting the implement to the frame; a linkage actuator coupled to the linkage assembly and the frame and configured to reposition the linkage assembly relative to the frame; a sensor configured to generate sensor position data associated with at least one of the linkage assembly and the linkage actuator representing a linkage position; an operator interface configured to receive operator input from an operator associated with the linkage actuator representing a velocity request; and an electronic control system having processing and memory architecture operatively coupled to the sensor, the operator interface, and the linkage actuator. The electronic control system is configured to generate an actuator command for the linkage actuator based on the velocity request and the linkage position that, upon execution, results in a constant velocity of the implement for the operator input regardless of the linkage position.

2. The work vehicle of example 1, wherein the control system includes an implement controller comprising: an operator input module configured to receive operator input data from the operator interface based on the operator input and to determine the velocity request based on the operator input data; a position module configured to receive the sensor position data and to determine the linkage position based on the sensor position data; and a constant velocity module coupled to receive the velocity request from the operator input module and the linkage position from the position module and to generate the actuator command for the linkage actuator.

3. The work vehicle of example 2, wherein, upon execution of the actuator command, the operator input module is configured to receive updated operator input data to determine an updated velocity request, the position module is configured to receive updated sensor position data and to determine an updated linkage position; and the constant velocity module is configured to receive the updated velocity request and the updated linkage position and to generate an updated actuator command according to open loop logic.

4. The work vehicle of example 1, wherein the sensor is arranged to measure a position of the linkage actuator as the sensor position data.

5. The work vehicle of example 1, wherein the linkage actuator is a hydraulic actuator with a rod partially arranged within a cylinder, and wherein the sensor is a linear sensor configured to generate the sensor position data as representing a position of the rod relative to the cylinder.

6. The work vehicle of example 1, wherein the sensor is arranged to measure a position of the linkage assembly as the sensor position data.

7. The work vehicle of example 1, wherein the constant velocity module is configured to generate the actuator command by implementing one or more maps or look-up tables that represent a relationship between a plurality of the linkage positions and a plurality of the actuator commands for a respective one of a plurality of the velocity requests.

8. The work vehicle of example 7, wherein the relationship represented in the one or more maps or look-up tables is based on a mechanical advantage of the linkage assembly through an actuation cycle of the plurality of the linkage positions.

9. The work vehicle of example 7, wherein the relationship represented in the one or more maps or look-up tables is based on a ratio of cylinder velocity of the linkage actuator to implement velocity through an actuation cycle of the plurality of the linkage positions.

10. A method is provided for controlling a linkage actuator on a work vehicle for manipulating an implement coupled to a frame of the work vehicle with a linkage assembly. The method includes receiving operator input at an operator interface as operator input data; determining a velocity request based on the operator input data; collecting sensor position data with a sensor associated with at least one of the linkage assembly and the linkage actuator; determining a linkage position of the at least one of the linkage assembly and the linkage actuator based on the sensor position data; generating an actuator command for the linkage actuator based on the velocity request and the linkage position that, upon execution, results in a constant velocity of the implement for the operator input regardless of the linkage position; and executing the actuator command at the linkage actuator to reposition the implement.

11. The method of example 10, wherein, upon the executing of the actuator command, the method further includes: collecting updated sensor position data; determining an updated linkage position; generating an updated actuator command based on the updated linkage position according to open loop logic; and executing the updated actuator command.

12. The method of example 10, wherein the linkage actuator is a hydraulic actuator with a rod partially arranged within a cylinder and the sensor is a linear sensor associated with the linkage actuator, and wherein the collecting the sensor position data includes collecting the sensor position data as representing a position of the rod relative to the cylinder.

13. The method of example 10, wherein the generating the actuator command includes implementing one or more maps or look-up tables that represent a relationship between a plurality of the linkage positions and a plurality of the actuator commands for a respective one of a plurality of the velocity requests.

14. The method of example 13, wherein the relationship represented in the one or more maps or look-up tables is based on a mechanical advantage of the linkage assembly through an actuation cycle of the plurality of linkage positions.

15. The method of example 13, wherein the relationship represented in the one or more maps or look-up tables is based on a ratio of cylinder velocity of the linkage actuator to implement velocity through an actuation cycle of the plurality of linkage positions.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the loader described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As will be appreciated by one skilled in the art, certain aspects of the disclosed subject matter can be embodied as a method, system (e.g., a work vehicle control system included in a work vehicle), or computer program product. Accordingly, certain embodiments can be implemented entirely as hardware, entirely as software (including firmware, resident software, micro-code, etc.) or as a combination of software and hardware (and other) aspects. Furthermore, certain embodiments can take the form of a computer program product on a computer-usable storage medium having computer-usable program code embodied in the medium.

Any suitable computer usable or computer readable medium can be utilized. The computer usable medium can be a computer readable signal medium or a computer readable storage medium. A computer-usable, or computer-readable, storage medium (including a storage device associated with a computing device or client electronic device) can be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one of more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium can be any tangible medium that can contain, or store a program for use by or in connection with the instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electromagnetic, optical, or any suitable combination thereof. A computer readable signal medium can be non-transitory and can be any computer readable medium that is not a computer readable storage medium and that can communicate, propagate, or transport a program for use by or in connection with an instruction execution system, apparatus, or device.

Aspects of certain embodiments are described herein can be described with reference to flowchart illustrations and/or block diagrams of methods, apparatus (systems) and computer program products according to embodiments of the disclosure. It will be understood that each block of any such flowchart illustrations and/or block diagrams, and combinations of blocks in such flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any flowchart and block diagrams in the figures, or similar discussion above, can illustrate the architecture, functionality, and operation of possible implementations of systems, methods and computer program products according to various embodiments of the present disclosure. In this regard, each block in the flowchart or block diagrams can represent a module, segment, or portion of code, which includes one or more executable instructions for implementing the specified logical function(s). It should also be noted that, in some alternative implementations, the functions noted in the block (or otherwise described herein) can occur out of the order noted in the figures. For example, two blocks shown in succession (or two operations described in succession) can, in fact, be executed substantially concurrently, or the blocks (or operations) can sometimes be executed in the reverse order, depending upon the functionality involved. It will also be noted that each block of any block diagram and/or flowchart illustration, and combinations of blocks in any block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand tire disclosure and recognize marry alternatives, modifications, and variations on the described example(s). Accordingly, various embodiments and implementations other than those explicitly described are within the scope of the following claims.

What is claimed is:

1. A work vehicle, comprising:
a frame;
an implement;
a linkage assembly mounting the implement to the frame;
a linkage actuator coupled to the linkage assembly and configured to reposition the linkage assembly relative to the frame;
a sensor configured to generate sensor position data associated with one or more of the linkage assembly and the linkage actuator representing a linkage position;
an operator interface configured to receive operator input from an operator associated with the linkage actuator representing a velocity request; and
an electronic control system having processing and memory architecture operatively coupled to the sensor, the operator interface, and the linkage actuator and configured to generate an actuator command for the linkage actuator based on the velocity request and the linkage position that, upon execution, results in a constant velocity of the implement for the operator input regardless of the linkage position.

2. The work vehicle of claim 1, wherein the control system includes an implement controller comprising:
an operator input module configured to receive operator input data from the operator interface based on the operator input and to determine the velocity request based on the operator input data;
a position module configured to receive the sensor position data and to determine the linkage position based on the sensor position data; and
a constant velocity module coupled to receive the velocity request from the operator input module and the linkage position from the position module and to generate the actuator command for the linkage actuator.

3. The work vehicle of claim 2, wherein, upon execution of the actuator command, the operator input module is configured to receive updated operator input data to determine an updated velocity request, the position module is configured to receive updated sensor position data and to determine an updated linkage position; and the constant velocity module is configured to receive the updated velocity request and the updated linkage position and to generate an updated actuator command according to open loop logic.

4. The work vehicle of claim 1, wherein the sensor is arranged to measure a position of the linkage actuator as the sensor position data.

5. The work vehicle of claim 1, wherein the linkage actuator is a hydraulic actuator with a rod partially arranged within a cylinder, and wherein the sensor is a linear sensor configured to generate the sensor position data as representing a position of the rod relative to the cylinder.

6. The work vehicle of claim 1, wherein the sensor is arranged to measure a position of the linkage assembly as the sensor position data.

7. The work vehicle of claim 1, wherein the constant velocity module is configured to generate the actuator command by implementing one or more maps or look-up tables that represent a relationship between a plurality of the linkage positions and a plurality of the actuator commands for a respective one of a plurality of the velocity requests.

8. The work vehicle of claim 7, wherein the relationship represented in the one or more maps or look-up tables is based on a mechanical advantage of the linkage assembly through an actuation cycle of the plurality of the linkage positions.

9. The work vehicle of claim 7, wherein the relationship represented in the one or more maps or look-up tables is based on a ratio of cylinder velocity of the linkage actuator to implement velocity through an actuation cycle of the plurality of the linkage positions.

10. A method of controlling a linkage actuator on a work vehicle for manipulating an implement coupled to a frame of the work vehicle with a linkage assembly, the method comprising:
receiving operator input at an operator interface as operator input data;
determining a velocity request based on the operator input data;
collecting sensor position data with a sensor associated with one or more of the linkage assembly and the linkage actuator;
determining a linkage position of the one or more of the linkage assembly and the linkage actuator based on the sensor position data;
generating an actuator command for the linkage actuator based on the velocity request and the linkage position that, upon execution, results in a constant velocity of the implement for the operator input regardless of the linkage position; and
executing the actuator command at the linkage actuator to reposition the implement.

11. The method of claim 10, wherein, upon the executing of the actuator command, the method further comprises: collecting updated sensor position data; determining an updated linkage position; generating an updated actuator command based on the updated linkage position according to open loop logic; and executing the updated actuator command.

12. The method of claim 10, wherein the linkage actuator is a hydraulic actuator with a rod partially arranged within a cylinder and the sensor is a linear sensor associated with the linkage actuator, and
wherein the collecting the sensor position data includes collecting the sensor position data as representing a position of the rod relative to the cylinder.

13. The method of claim 10, wherein the generating the actuator command includes implementing one or more maps or look-up tables that represent a relationship between a plurality of the linkage positions and a plurality of the actuator commands for a respective one of a plurality of the velocity requests.

14. The method of claim 13, wherein the relationship represented in the one or more maps or look-up tables is based on a mechanical advantage of the linkage assembly through an actuation cycle of the plurality of linkage positions.

15. The method of claim 13, wherein the relationship represented in the one or more maps or look-up tables is based on a ratio of cylinder velocity of the linkage actuator to implement velocity through an actuation cycle of the plurality of linkage positions.

16. A control system in a work vehicle for controlling a linkage actuator for manipulating an implement coupled to a frame of the work vehicle with a linkage assembly, the control system comprising:
one or more electronic controllers having processing and memory architecture including:
an operator input module configured to receive operator input data associated with operator input at a vehicle operator interface, the operator input module configured to determine a velocity request based on the operator input data;
a position module configured to receive sensor position data associated with one or more of the linkage assembly and the linkage actuator and to determine a linkage position of the one or more of the linkage assembly and the linkage actuator based on the sensor position data; and
a constant velocity module coupled to receive the velocity request from the operator input module and the linkage position from the position module and configured to generate an actuator command for the linkage actuator that, upon execution, results in a constant velocity of the implement for the operator input regardless of the linkage position.

17. The control system of claim 16, wherein the constant velocity module is configured to generate the actuator command by implementing one or more maps or look-up tables that represent a relationship between a plurality of the linkage positions and a plurality of the actuator commands for a respective one of a plurality of the velocity requests.

18. The control system of claim 17, wherein the relationship represented in the one or more maps or look-up tables is based on a mechanical advantage of the linkage assembly through an actuation cycle of the plurality of linkage positions.

19. The control system of claim 17, wherein the relationship represented in the one or more maps or look-up tables is based on a ratio of cylinder velocity of the linkage actuator to implement velocity through an actuation cycle of the plurality of linkage positions.

20. The control system of claim 16, wherein, upon execution of the actuator command, the operator input module is configured to receive updated operator input data to determine an updated velocity request, the position module is configured to receive updated sensor position data and to determine an updated linkage position; and the constant velocity module is configured to receive the updated velocity request and the updated linkage position and to generate an updated actuator command according to open loop logic.

* * * * *